April 28, 1931.  G. L. KNAPP  1,803,065
INNER TUBE HOLDER
Filed Aug. 24, 1928
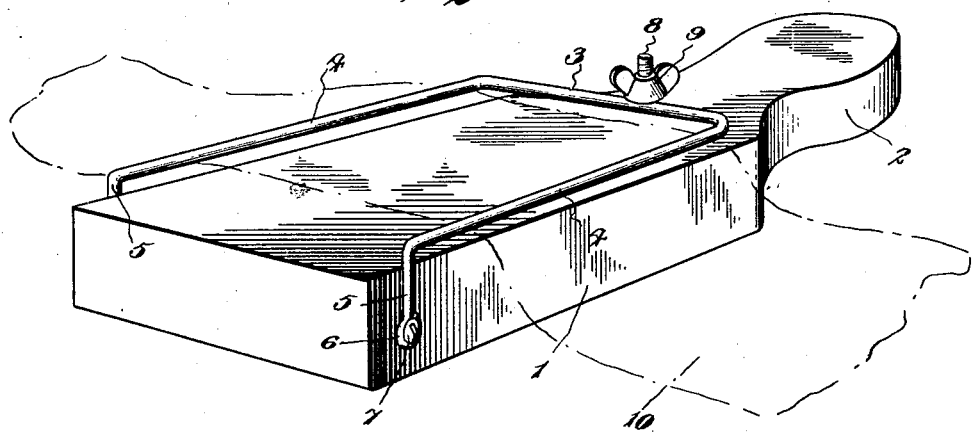
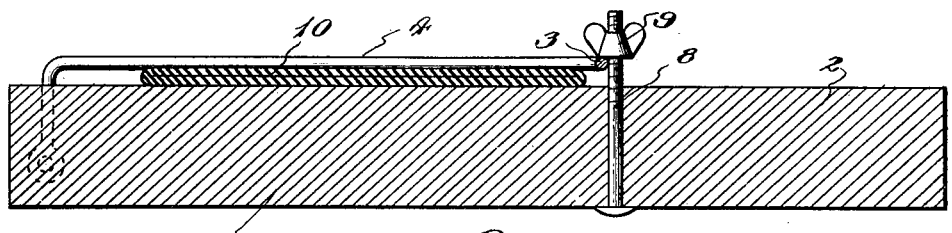
Inventor
G. L. Knapp
By
Lacey & Lacey
Attorney Patented Apr. 28, 1931

1,803,065

UNITED STATES PATENT OFFICE

GEORGE L. KNAPP, OF MAYWOOD, ILLINOIS

INNER-TUBE HOLDER

Application filed August 24, 1928. Serial No. 301,820.

This invention relates to a device by means of which an inner tube of an automobile tire may be held while repairing the same, and one object of the invention is to provide a device by means of which a tube which has become punctured may be secured in a flattened condition against a firm flat surface and thereby allow the surface of the tube about a puncture to be easily cleaned and a patch cemented into place.

Another object of the invention is to allow the flattened tube when placed across the body portion of the device to be very firmly clamped against it in a flattened condition and prevented from moving, thereby allowing the surface of the tube to be easily cleaned without danger of the tube slipping and also allowing the patch to be firmly pressed against the tube until it adheres properly.

Another object of the invention is to provide a tube holder which may be easily held in one hand with a tube secured upon it or gripped between a person's knees, thereby leaving both hands free to clean the tube and apply a patch.

Another object of the invention is to provide a tube holder which is very simple in construction and easy to handle and operate.

The invention is illustrated in the accompanying drawing, wherein

Figure 1 is a perspective view of the improved tube holder, a tube held by the device being indicated by dotted lines, and Figure 2 is a longitudinal sectional view through the holder with a tube held thereto.

The body portion 1 of this holder may be formed of wood or metal and it is preferably rectangular in shape so that it will be formed with a flat upper surface and may rest flat upon a workbench or other support without tilting if it is desired to place the device upon a support while repairing a tire instead of holding it in one hand. One end of the body is reduced, as shown in Figure 1, in order to form a handle 2 so that it can be easily held in one hand while applying a tire tube in position across the body portion and also allow the device to be held in one hand or gripped between a person's knees while repairing a tube.

In order to firmly hold a tube in a flattened condition against the upper face of the body, there has been provided a clamp consisting of a metal strand bent to form a U-shaped clamp having a bridge 3 from which extend arms 4. The bridge 3 is of sufficient length to extend across the body and the arms extend longitudinally of the body and have their end portions bent downwardly, as shown at 5, and terminating in eyes 6 through which are passed screws 7 in order to pivotally connect the clamp with the body. It will be understood that other means may be provided in order to pivotally connect the arms of the clamp with the body if so desired. A post 8 which preferably consists of a bolt projects upwardly from the body at its intersection with the handle 2 and this post which is threaded carries a winged nut 9 adapted to engage over the bridge 3 of the clamp, as shown in Figure 2, and move the clamp downwardly into position to firmly hold a tire tube in a flattened condition across the upper face of the body.

When the tube holder is in use, a tire tube 10 which has become punctured is placed across the upper face of the body in a flattened condition with the punctured portion of the tube disposed uppermost and the puncture intermediate the width and length of the body. The clamp is swung downwardly into position to bear against the tube adjacent opposite sides of the body with its bridge 3 disposed close to the post 8 and beneath the nut 9. The tube is smooth so that it extends flat across the body and the nut 9 is then tightened so that it forces the clamp downwardly until the tube is firmly gripped between the clamp and body. The tube will then be firmly held in place and prevented from slipping longitudinally or transversely of the body. After the tube has been secured in place, the holder may be set upon a workbench or held in one hand or gripped between a person's knees by the handle 2. The surface of the tube about the puncture can then be very easily cleaned and a patch applied. Since the tube is held against the upper face of the body which is flat the tube will be retained in place against a flat and firm surface. Therefore, the tube may be very easily cleaned and a patch applied without interference by wrinkles in the tube and also without danger of the tube being liable to slip while it is being cleaned or a patch applied.

Having thus described the invention, I claim:

A tube repairing clamp comprising a rectangular body having a handle at one end, a U-shaped member having end portions of its side arms bent laterally in the same direction and extending along the sides of the body and terminating in eyes which receive fastenings pivotally connecting the member to the body, a post projecting from the body adjacent the handle, and a nut threaded on the projecting end of the post and engageable over the closed end of the said U-shaped member to admit of clamping a tube between the body and member.

GEORGE L. KNAPP.